United States Patent
Ratnesh Kumar et al.

(10) Patent No.: US 11,455,807 B2
(45) Date of Patent: Sep. 27, 2022

(54) TRAINING NEURAL NETWORKS FOR VEHICLE RE-IDENTIFICATION

(71) Applicant: NVIDIA Corporation, San Jose, CA (US)

(72) Inventors: Fnu Ratnesh Kumar, Campbell, CA (US); Farzin Aghdasi, East Paolo Alto, CA (US); Parthasarathy Sriram, Los Altos, CA (US); Edwin Weill, Mountain View, CA (US)

(73) Assignee: NVIDIA Corporation, San Jose, CA (US)

( * ) Notice: Subject to any disclaimer, the term of this patent is extended or adjusted under 35 U.S.C. 154(b) by 475 days.

(21) Appl. No.: 16/577,716

(22) Filed: Sep. 20, 2019

(65) Prior Publication Data

US 2020/0097742 A1 Mar. 26, 2020

Related U.S. Application Data

(60) Provisional application No. 62/734,199, filed on Sep. 20, 2018.

(51) Int. Cl.
*G06K 9/00* (2022.01)
*G06V 20/58* (2022.01)
(Continued)

(52) U.S. Cl.
CPC ............ *G06V 20/584* (2022.01); *G06F 17/18* (2013.01); *G06N 3/0454* (2013.01);
(Continued)

(58) Field of Classification Search
CPC ...... G06V 20/584; G06V 10/82; G06V 20/52; G06F 17/18; G06N 3/0454; G06N 3/0472;
(Continued)

(56) References Cited

U.S. PATENT DOCUMENTS 9,990,687 B1 * 6/2018 Kaufhold ............... G06V 10/82
10,176,405 B1 * 1/2019 Zhou ......................... G06T 7/73
(Continued)

FOREIGN PATENT DOCUMENTS

CN 106709528 A * 5/2017 ........... G06K 9/6262
CN 108734300 A * 11/2018 ......... G06F 16/5838
(Continued)

OTHER PUBLICATIONS

International Preliminary Report on Patentability received for PCT Application No. PCT/US2019/052213, dated Apr. 1, 2021, 14 pages.
(Continued)

*Primary Examiner* — Mahendra R Patel
(74) *Attorney, Agent, or Firm* — Taylor English Duma LLP

(57) ABSTRACT

In various examples, a neural network may be trained for use in vehicle re-identification tasks—e.g., matching appearances and classifications of vehicles across frames—in a camera network. The neural network may be trained to learn an embedding space such that embeddings corresponding to vehicles of the same identify are projected closer to one another within the embedding space, as compared to vehicles representing different identities. To accurately and efficiently learn the embedding space, the neural network may be trained using a contrastive loss function or a triplet loss function. In addition, to further improve accuracy and efficiency, a sampling technique—referred to herein as batch sample—may be used to identify embeddings, during training, that are most meaningful for updating parameters of the neural network.

21 Claims, 10 Drawing Sheets

(51) Int. Cl.
   *G06F 17/18* (2006.01)
   *G06N 3/04* (2006.01)
   *G06N 3/08* (2006.01)
   *G06T 1/20* (2006.01)
(52) U.S. Cl.
   CPC ............. *G06N 3/0472* (2013.01); *G06N 3/08* (2013.01); *G06T 1/20* (2013.01)
(58) Field of Classification Search
   CPC ........ G06N 3/08; G06N 3/0445; G06N 5/003; G06N 7/005; G06N 20/10; G06N 3/0481; G06T 1/20; G06K 9/627
   USPC ......................................................... 382/103
   See application file for complete search history.

(56) References Cited

U.S. PATENT DOCUMENTS

| | | | |
|---|---|---|---|
| 11,182,598 B2 | 11/2021 | Sriram et al. | |
| 11,341,368 B2* | 5/2022 | Yao | G06N 3/08 |
| 2017/0308770 A1* | 10/2017 | Jetley | G06V 10/82 |
| 2017/0357896 A1* | 12/2017 | Tsatsin | G06N 3/084 |
| 2018/0082172 A1* | 3/2018 | Patel | G06N 3/08 |
| 2019/0279005 A1* | 9/2019 | Ogale | G06N 3/0454 |

FOREIGN PATENT DOCUMENTS

| | | | | |
|---|---|---|---|---|
| CN | 108764018 A | * | 11/2018 | G06K 9/00825 |
| CN | 108875754 A | * | 11/2018 | G06K 9/4604 |
| CN | 109165589 A | * | 1/2019 | G06K 9/00771 |
| WO | WO-2016145379 A1 | * | 9/2016 | G06N 3/0472 |
| WO | WO-2017212459 A1 | * | 12/2017 | G06N 3/0454 |
| WO | WO-2018211143 A1 | * | 11/2018 | G06N 3/0445 |

OTHER PUBLICATIONS

International Search Report and Written Opinion in international application No. PCT/US2019/052213 dated Jan. 15, 2020.
Bai, Y., Lou, Y., Gao, F., Wang, S., Wu, Y., & Duan, L. Y. (2018). "Group-sensitive triplet embedding for vehicle reidentification." IEEE Transactions on Multimedia, 20(9), 2385-2399.
Yan, K., Tian, Y., Wang, Y., Zeng, W., & Huang, T. (2017). "Exploiting multi-grain ranking constraints for precisely searching visually-similar vehicles." In Proceedings of the IEEE International Conference on Computer Vision (pp. 562-570).
Hermans, Alexander, Lucas Beyer, and Bastian Leibe. "In defense of the triplet loss for person re-identification." arXiv preprint arXiv:1703.07737 (Nov. 21, 2017).
Ristani, Ergys, and Carlo Tomasi. "Features for multi-target multi-camera tracking and re-identification." Proceedings of the IEEE conference on computer vision and pattern recognition. 2018.
Abadi, Martin, Ashish Agarwal, Paul Barham, Eugene Brevdo, Zhifeng Chen, Craig Citro, Greg S. Corrado et al. "Tensorflow: Large-scale machine learning on heterogeneous distributed systems." arXiv preprint arXiv: 1603.04467 (2016).
Bai, Yan, Yihang Lou, Feng Gao, Shiqi Wang, Yuwei Wu, and Ling-Yu Duan. "Group-sensitive triplet embedding for vehicle reidentification." IEEE Transactions on Multimedia 20, No. 9 (2018): 2385-2399.
Bąk, Sławomir, Marco San Biagio, Ratnesh Kumar, Vittorio Murino, and Francois Brçmond. "Exploiting feature correlations by Brownian statistics for people detection and recognition." IEEE Transactions on Systems, Man, and Cybernetics: Systems 47, No. 9 (2016): 2538-2549.
J. Berclaz, F. Fleuret, E. Turetken, and P. Fua. Multiple Object Tracking using K-Shortest Paths Optimization. PAMI, 33(9): 1806-1819, 2011. 1.
Bromley, Jane, Isabelle Guyon, Yann LeCun, Eduard Säckinger, and Roopak Shah. "Signature verification using a"siamese" time delay neural network." In Advances in neural information processing systems, pp. 737-744. 1994.
Chopra, Sumit, Raia Hadsell, and Yann LeCun. "Learning a similarity metric discriminatively, with application to face verification " In CVPR (1), pp. 539-546. 2005.
Farenzena, Michela, Loris Bazzani, Alessandro Perina, Vittorio Murino, and Marco Cristani. "Person re-identification by symmetry-driven accumulation of local features." In 2010 IEEE Computer Society Conference on Computer Vision and Pattern Recognition, pp. 2360-2367. IEEE, 2010.
Goodfellow, Ian, Jean Pouget-Abadie, Mehdi Mirza, Bing Xu, David Warde-Farley, Sherjil Ozair, Aaron Courville, and Yoshua Bengio. "Generative adversarial nets." In Advances in neural information processing systems, pp. 2672-2680. 2014.
Guo, Haiyun, Chaoyang Zhao, Zhiwei Liu, Jinqiao Wang, and Hanqing Lu. "Learning coarse-to-fine structured feature embedding for vehicle re-identification." In Thirty-Second AAAI Conference on Artificial Intelligence. 2018.
He, Kaiming, Xiangyu Zhang, Shaoqing Ren, and Jian Sun. "Deep residual learning for image recognition." In Proceedings of the IEEE conference on computer vision and pattern recognition, pp. 770-778. 2016.
Heili, Alexandre, Adolfo López-Méndez, and Jean-Marc Odobez. "Exploiting long-term connectivity and visual motion in CRF-based multi-person tracking." IEEE Transactions on Image Processing 23, No. 7 (2014): 3040-3056.
Hermans, Alexander, Lucas Beyer, and Bastian Leibe. "In defense of the triplet loss for person re-identification." arXiv preprint arXiv: 1703.07737 (2017).
Hochreiter, Sepp, and Jürgen Schmidhuber. "Long short-term memory." Neural computation 9, No. 8 (1997): 1735-1780.
Hoffer, Elad, and Nir Ailon. "Deep metric learning using triplet network." In International Workshop on Similarity-Based Pattern Recognition, pp. 84-92. Springer, Cham, 2015.
Howard, Andrew G., Menglong Zhu, Bo Chen, Dmitry Kalenichenko, Weijun Wang, Tobias Weyand, Marco Andreetto, and Hartwig Adam. "Mobilenets: Efficient convolutional neural networks for mobile vision applications." arXiv preprint arXiv: 1704.04861 (2017).
Hu, Qichang, Huibing Wang, Teng Li, and Chunhua Shen. "Deep CNNs with spatially weighted pooling for fine-grained car recognition." IEEE Transactions on Intelligent Transportation Systems 18, No. 11 (2017): 3147-3156.
Jain, Vishal, Zitha Sasindran, Anoop Rajagopal, Soma Biswas, Harish S. Bharadwaj, and K. R. Ramakrishnan. "Deep automatic license plate recognition system." In Proceedings of the Tenth Indian Conference on Computer Vision, Graphics and Image Processing, p. 6. ACM, 2016.
Deng, Jia, Wei Dong, Richard Socher, Li-Jia Li, Kai Li, and Li Fei-Fei. "Imagenet: A large-scale hierarchical image database." In 2009 IEEE conference on computer vision and pattern recognition, pp. 248-255. Ieee, 2009.
Kanaci, Aytaç, Xiatian Zhu, and Shaogang Gong. "Vehicle reidentification by fine-grained cross-level deep learning." In BMVC AMMDS Workshop, vol. 2, pp. 772-788. 2017.
Kingma, Diederik P., and Jimmy Ba. "Adam: A method for stochastic optimization." arXiv preprint arXiv:1412.6980 (2014).
Liao, Shengcai, Yang Hu, Xiangyu Zhu, and Stan Z. Li. "Person re-identification by local maximal occurrence representation and metric learning." In Proceedings of the IEEE conference on computer vision and pattern recognition, pp. 2197-2206. 2015.
Lin, Yen-Liang, Vlad I. Morariu, Winston Hsu, and Larry S. Davis. "Jointly optimizing 3d model fitting and fine-grained classification." In European Conference on Computer Vision, pp. 466-480. Springer, Cham, 2014.
Liu, Hongye, Yonghong Tian, Yaowei Yang, Lu Pang, and Tiejun Huang. "Deep relative distance learning: Tell the difference between similar vehicles." In Proceedings of the IEEE Conference on Computer Vision and Pattern Recognition, pp. 2167-2175. 2016.
Liu, Xinchen, Wu Liu, Huadong Ma, and Huiyuan Fu. "Large-scale vehicle re-identification in urban surveillance videos." In 2016 IEEE International Conference on Multimedia and Expo (ICME), pp. 1-6. IEEE, 2016.

(56) References Cited

OTHER PUBLICATIONS

Liu, Xinchen, Huadong Ma, Huiyuan Fu, and Mo Zhou. "Vehicle retrieval and trajectory inference in urban traffic surveillance scene." In Proceedings of the International Conference on Distributed Smart Cameras, p. 26. ACM, 2014.
Yang, Linjie, Ping Luo, Chen Change Loy, and Xiaoou Tang. "A large-scale car dataset for fine-grained categorization and verification." In Proceedings of the IEEE Conference on Computer Vision and Pattern Recognition, pp. 3973-3981. 2015.
Ma, Bingpeng, Yu Su, and Frédéric Jurie. "Local descriptors encoded by fisher vectors for person re-identification." In European Conference on Computer Vision, pp. 413-422. Springer, Berlin, Heidelberg, 2012.
Ma, Bingpeng, Yu Su, and Frédéric Jurie. "Bicov: a novel image representation for person re-identification and face verification." 2012.
Mishchuk, Anastasiia, Dmytro Mishkin, Filip Radenovic, and Jiri Matas. "Working hard to know your neighbor's margins: Local descriptor learning loss." In Advances in Neural Information Processing Systems, pp. 4826-4837. 2017.
Mnih, Volodymyr, Nicolas Heess, and Alex Graves. "Recurrent models of visual attention." In Advances in neural information processing systems, pp. 2204-2212. 2014.
Naphade, Milind, Ming-Ching Chang, Anuj Sharma, David C. Anastasiu, Vamsi Jagarlamudi, Pranamesh Chakraborty, Tingting Huang et al. "The 2018 nvidia ai city challenge." In Proceedings of the IEEE Conference on Computer Vision and Pattern Recognition Workshops, pp. 53-60. 2018.
Rippel, Oren, Manohar Paluri, Piotr Dollar, and Lubomir Bourdev. "Metric learning with adaptive density discrimination." arXiv preprint arXiv: 1511.05939 (2015).
Ristani, Ergys, and Carlo Tomasi. "Features for multi-target multi-camera tracking and re-identification." In Proceedings of the IEEE conference on computer vision and pattern recognition, pp. 6036-6046. 2018.
Ristani, Ergys, Francesco Solera, Roger Zou, Rita Cucchiara, and Carlo Tomasi. "Performance measures and a data set for multi-target, multi-camera tracking." In European Conference on Computer Vision, pp. 17-35. Springer, Cham, 2016.
Schroff, Florian, Dmitry Kalenichenko, and James Philbin. "Facenet: A unified embedding for face recognition and clustering." In Proceedings of the IEEE conference on computer vision and pattern recognition, pp. 815-823. 2015.
Shen, Li, Zhouchen Lin, and Qingming Huang. "Relay backpropagation for effective learning of deep convolutional neural networks." In European conference on computer vision, pp. 467-482. Springer, Cham, 2016.
Shen, Yantao, Tong Xiao, Hongsheng Li, Shuai Yi, and Xiaogang Wang. "Learning deep neural networks for vehicle re-id with visual-spatio-temporal path proposals." In Proceedings of the IEEE International Conference on Computer Vision, pp. 1900-1909. 2017.
Shitrit, Horesh Ben, Jerome Berclaz, Francois Fleuret, and Pascal Fua. "Tracking multiple people under global appearance constraints." In 2011 International Conference on Computer Vision, pp. 137-144. IEEE, 2011.
Simonyan, Karen, and Andrew Zisserman. "Very deep convolutional networks for large-scale image recognition." arXiv preprint arXiv:1409.1556 (2014).
Sochor, Jakub, Adam Herout, and Jiri Havel. "Boxcars: 3d boxes as cnn input for improved fine-grained vehicle recognition." In Proceedings of the IEEE Conference on Computer Vision and Pattern Recognitio.
Tang, Siyu, Mykhaylo Andriluka, Bjoern Andres, and Bernt Schiele. "Multiple people tracking by lifted multicut and person re-identification." In Proceedings of the IEEE Conference on Computer Vision and Pattern Recognition, pp. 3539-3548. 2017.
Tang, Huixuan, Scott Cohen, Brian Price, Stephen Schiller, and Kiriakos N. Kutulakos. "Depth from Defocus in the Wild." In Proceedings of the IEEE Conference on Computer Vision and Pattern Recognition, pp. 2740-2748. 2017.
Wang, Zhongdao, Luming Tang, Xihui Liu, Zhuliang Yao, Shuai Yi, Jing Shao, Junjie Yan, Shengjin Wang, Hongsheng Li, and Xiaogang Wang. "Orientation invariant feature embedding and spatial temporal regularization for vehicle re-identification." In Proceedings of the IEEE International Conference on Computer Vision, pp. 379-387. 2017.
Weinberger, Kilian Q., and Lawrence K. Saul. "Distance metric learning for large margin nearest neighbor classification." Journal of Machine Learning Research 10, No. Feb (2009): 207-244.
Wojke, Nicolai, and Alex Bewley. "Deep cosine metric learning for person re-identification." In 2018 IEEE winter conference on applications of computer vision (WACV), pp. 748-756. IEEE, 2018.
Wu, Chao-Yuan, R. Manmatha, Alexander J. Smola, and Philipp Krahenbuhl. "Sampling matters in deep embedding learning." In Proceedings of the IEEE International Conference on Computer Vision, pp. 2840-2848. 2017.
Xiao, Tong, Hongsheng Li, Wanli Ouyang, and Xiaogang Wang. "Learning deep feature representations with domain guided dropout for person re-identification." In Proceedings of the IEEE conference on computer vision and pattern recognition, pp. 1249-1258. 2016.
Yan, Ke, Yonghong Tian, Yaowei Wang, Wei Zeng, and Tiejun Huang. "Exploiting multi-grain ranking constraints for precisely searching visually-similar vehicles." In Proceedings of the IEEE International Conference on Computer Vision, pp. 562-570. 2017. nd pattern recognition, pp. 1249-1258. 2016.
Zamir, Amir Roshan, Afshin Dehghan, and Mubarak Shah. "Gmcp-tracker: Global multi-object tracking using generalized minimum clique graphs." In European Conference on Computer Vision, pp. 343-356. Springer, Berlin, Heidelberg, 2012.
Zapletal, Dominik, and Adam Herout. "Vehicle re-identification for automatic video traffic surveillance." In 2016 IEEE Conference on Computer Vision and Pattern Recognition Workshops (CVPRW), pp. 1568-1574. IEEE, 2016.
Gu, Hui-Zhen, and Suh-Yin Lee. "Car model recognition by utilizing symmetric property to overcome severe pose variation." Machine vision and applications 24, No. 2 (2013): 255-274.
Kumar, Ratnesh, Guillaume Charpiat, and Monique Thonnat. "Multiple object tracking by efficient graph partitioning." In Asian Conference on Computer Vision, pp. 445-460. Springer, Cham, 2014.
Liang, Ming, Bin Yang, Shenlong Wang, and Raquel Urtasun. "Deep continuous fusion for multi-sensor 3d object detection." In Proceedings of the European Conference on Computer Vision (ECCV), pp. 641-656. 2018.
Liao, Liang, Ruimin Hu, Jun Xiao, Qi Wang, Jing Xiao, and Jun Chen. "Exploiting effects of parts in fine-grained categorization of vehicles." In 2015 IEEE International Conference on Image Processing (ICIP), pp. 745-749. IEEE, 2015.
Liu, Xinchen, Wu Liu, Tao Mei, and Huadong Ma. "A deep learning-based approach to progressive vehicle re-identification for urban surveillance." In European Conference on Computer Vision, pp. 869-884. Springer, Cham, 2016.
Zhang, Li, Yuan Li, and Ramakant Nevatia. "Global data association for multi-object tracking using network flows." In 2008 IEEE Conference on Computer Vision and Pattern Recognition, pp. 1-8. IEEE, 2008.
Španhel, Jakub, Jakub Sochor, Roman Juránek, Adam Herout, Lukáš Markšik, and Pavel Zemčik. "Holistic recognition of low quality license plates by cnn using track annotated data." In 2017 14th IEEE International Conference on Advanced Video and Signal Based Surveillance (AVSS), pp. 1-6. IEEE, 2017.
Zhang, Li, Tao Xiang, and Shaogang Gong. "Learning a discriminative null space for person re-identification." In Proceedings of the IEEE conference on computer vision and pattern recognition, pp. 1239-1248. 2016.
Zhou, Yi, and Ling Shao. "Vehicle re-identification by adversarial bi-directional LSTM network." In 2018 IEEE Winter Conference on Applications of Computer Vision (WACV), pp. 653-662. IEEE, 2018.

(56) References Cited

OTHER PUBLICATIONS

Zhou, Yi, and Ling Shao. "Aware attentive multi-view inference for vehicle re-identification." In Proceedings of the IEEE Conference on Computer Vision and Pattern Recognition, pp. 6489-6498. 2018.

* cited by examiner

| Sampling Variant | Positive Weight: $W_p$ | Negative Weight: $W_n$ |
|---|---|---|
| Batch All (BA) | 1 | 1 |
| Batch Hard (BH) | $[x_p == \arg\max_{x \in P(a)} D_{ax}]$ | $[x_n == \arg\min_{x \in N(a)} D_{ax}]$ |
| Batch Sample (BS) | $[x_p == \text{multinomial}_{x \in P(a)}\{D_{ax}\}]$ | $[x_n == \text{MULTINOMIAL}_{x \in N(a)}\{-D_{ax}\}]$ |
| Batch Weighted (BW) | $\dfrac{e^{D_{ap}}}{\sum_{x \in P(a)} e^{D_{ax}}}$ | $\dfrac{e^{-D_{an}}}{\sum_{x \in N(a)} e^{-D_{ax}}}$ |

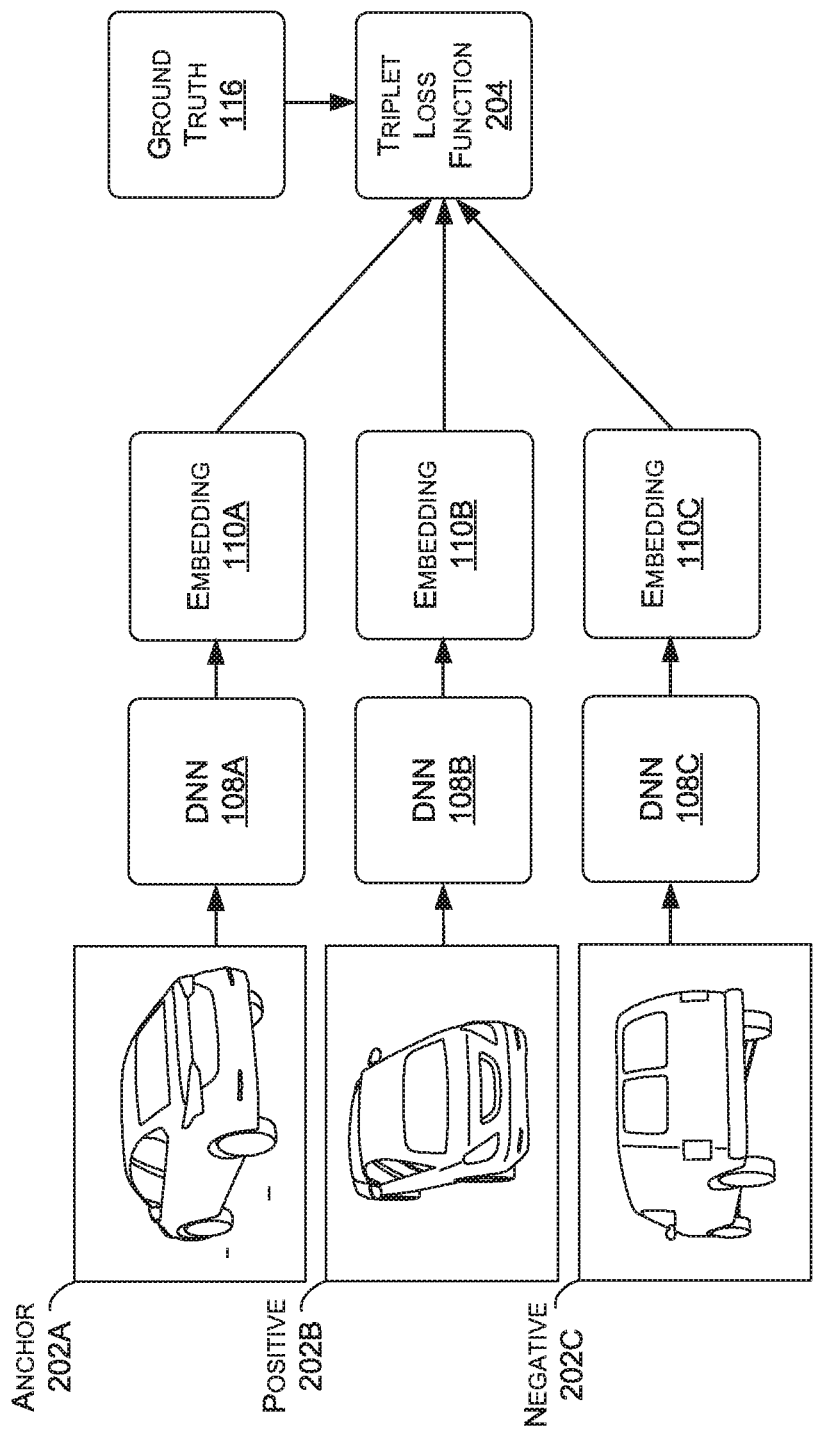

| SAMPLING | MAP | TOP-1 | TOP-2 | TOP-5 |
|---|---|---|---|---|
| TRIPLET, NOT-NORMALIZED | | | | |
| BH | 65.10 | 87.25 | 91.54 | 94.76 |
| BA | 66.91 | 90.11 | 93.38 | 96.01 |
| BS | 67.55 | 90.23 | 92.91 | 96.42 |
| BW | 67.02 | 89.99 | 93.15 | 96.54 |
| TRIPLET, NORMALIZED | | | | |
| BH | 53.72 | 72.65 | 80.27 | 86.83 |
| BA | 27.60 | 42.91 | 53.16 | 67.76 |
| BS | 33.79 | 48.75 | 58.64 | 73.54 |
| BW | 44.29 | 60.91 | 69.85 | 80.63 |
| CONTRASTIVE, NORMALIZED | | | | |
| BH | 59.21 | 80.51 | 85.52 | 90.64 |
| BS | 52.09 | 71.51 | 78.84 | 86.95 |
| CONTRASTIVE, NOT-NORMALIZED | | | | |
| BH | 56.84 | 75.33 | 82.30 | 90.29 |
| BS | 48.85 | 65.49 | 74.55 | 85.76 |

VeRi ACCURACY RESULTS (%) USING TRIPLET AND CONTRASTIVE LOSS FOR DIFFERENT BATCH SAMPLING VARIANTS.

FIGURE 4A

| DATASET, SAMPLING | SMALL | MEDIUM | LARGE |
|---|---|---|---|
| WITH PRETRAINED WEIGHTS | | | |
| VD1, BW | 82.66 | 60.15 | 52.10 |
| VD1, BS | 81.36 | 58.91 | 50.68 |
| VD1, BA | 79.46 | 56.79 | 49.26 |
| VD1, BH | 82.04 | 60.40 | 52.17 |
| VD2, BW | 80.93 | 65.44 | 58.94 |
| VD2, BS | 75.52 | 58.35 | 51.71 |
| VD2, BA | 70.07 | 50.56 | 43.46 |
| VD2, BH | 78.95 | 62.32 | 55.86 |

MAP (%) FOR RETRIEVALS ON VARIOUS REFERENCE SETS OF DIFFERENT SIZES. TRAINING IS PERFORMED USING PRE-TRAINED WEIGHTS WITH BATCH SIZE OF 18X4.

| Method | Small | Medium | Large | X-Large |
|---|---|---|---|---|
| BA | 84.65 | 79.85 | 75.95 | 59.74 |
| BS | 86.19 | 81.69 | 78.16 | 62.41 |
| BW | 85.92 | 81.41 | 78.13 | 62.12 |
| BH | 85.59 | 80.76 | 76.87 | 60.33 |

Accuracy results on VehicleID using mAP metric (%). Batch size for our experiments is set to 18x16 samples.

| Method | Small | Medium | Large | X-Large |
|---|---|---|---|---|
| BA | 81.90 | 76.57 | 72.60 | 54.95 |
| BS | 84.17 | 79.05 | 75.52 | 59.10 |
| BW | 84.90 | 80.80 | 77.20 | 60.92 |
| BH | 83.34 | 78.72 | 75.02 | 57.97 |

Accuracy results on VehicleID using mAP metric (%). This is with default PK batch size of (18x4).

Figure 4D

TRAINING NEURAL NETWORKS FOR VEHICLE RE-IDENTIFICATION

CROSS-REFERENCE TO RELATED APPLICATIONS

This application claims the benefit of U.S. Provisional Application No. 62/734,199, filed on Sep. 20, 2018, which is hereby incorporated by reference in its entirety.

This application is related to U.S. Non-Provisional application Ser. No. 16/365,581, filed on Mar. 26, 2019, and U.S. Provisional Application No. 62/648,339, filed on Mar. 26, 2018, each of which is hereby incorporated by reference in its entirety.

BACKGROUND

Matching appearances of vehicles or other objects across multiple cameras, or multiple frames from a single camera, is an integral task for vehicle or object tracking applications. Vehicle re-identification aims to identify the same vehicle across a camera network, which is an increasingly complex problem with the proliferation of cameras in cities and other highly congested traffic areas. For example, re-identifying a same vehicle from various different orientations across multiple frames captured by any number of cameras becomes progressively more challenging, due to the increasing number of vehicles in an environment, in addition to any number of permanent or transient objects potentially obstructing a camera's line of sight of a particular vehicle.

Conventional approaches have been developed to perform re-identification tasks on persons, such as by training a deep neural network (DNN) for person classification tasks using a variety of loss functions. According to one approach, the DNNs may be trained using cross-entropy loss, but because each identity is considered as a separate category and the number of categories is equal to the number of identities in a training set, learning becomes computationally prohibitive. Other conventional approaches have used DNNs trained using contrastive loss or triplet loss to learn embeddings for an embedding space—e.g., face embeddings for face verification. However, these conventional approaches are unable to provide accurate enough results for tasks such as vehicle re-identification.

Other conventional approaches include vehicle classification which is a closely related problem to vehicle re-identification. For example, vehicle classification may identify a make, model, and/or year for a vehicle. However, vehicle re-identification is a more fine-grained problem than vehicle classification because re-identification should be able to extract visual differences—e.g., subtle cosmetic or color differences—between two vehicles belonging to a same model category. In addition, different from vehicle classification, vehicle re-identification is expected to work without any prior knowledge of the possible vehicle models categories in a certain geographical area. As such, vehicle classification approaches fail to provide accurate and usable results for vehicle re-identification tasks.

SUMMARY

Embodiments of the present disclosure relate to training deep neural networks (DNNs) for vehicle re-identification. Systems and methods are disclosed for training DNNs to re-identify vehicles or other objects at any number of different orientations and positions, and captured by any number of different cameras.

In contrast to conventional systems, such as those described above, the DNN(s) of the present disclosure may be trained to predict embeddings corresponding to vehicles represented in a plurality of images captured by any number of cameras. The DNN(s) may compute embeddings corresponding to vehicles of a same identity as being in close proximity to one another in an embedding space and may compute embeddings corresponding to vehicles of different identities as being further apart—all while requiring only identity-level annotations for training while maintaining a small embedding dimension for efficient inference. The DNN(s) may use batches in addition to contrastive loss or triplet loss (e.g., replacing the margin a by a SoftPlus function, in embodiments) for training, where only an embedding(s) corresponding to a more meaningful sample(s) from a batch may be used for calculating the loss. To determine the meaningful sample(s), a batch sampling variant—referred to herein as "batch sample"—may use a multinomial distribution to identify an embedding corresponding to the meaningful sample. In addition, some embodiments may use a pre-trained network while others may train end-to-end (e.g., from scratch), and learning rates may be adjusted—e.g. such that pre-trained models have a learning rate less than end-to-end models—depending on the embodiment. As a result, the DNN(s) of the present disclosure may be trained more effectively and efficiently, reducing compute resources as compared to conventional solutions, while maintaining efficient inference for real-time or near real-time predictions in deployment for vehicle re-identification tasks.

BRIEF DESCRIPTION OF THE DRAWINGS

The present systems and methods for training neural networks for vehicle re-identification is described in detail below with reference to the attached drawing figures, wherein:

FIG. 3 is an illustration of using triplet loss for training a DNN to predict embeddings, in accordance with some embodiments of the present disclosure;

FIG. 4A is a table including testing results on a dataset using contrastive loss or triplet loss and normalization or no normalization layers, in accordance with some embodiments of the present disclosure;

FIG. 4B is a table including testing results on a dataset using various sampling variants, in accordance with some embodiments of the present disclosure;

FIG. 4C is a table including testing results on a dataset using various sampling variants, in accordance with some embodiments of the present disclosure;

FIG. 4D is a table including testing results on a dataset using various sampling variants, in accordance with some embodiments of the present disclosure;

DETAILED DESCRIPTION

Figure 1:
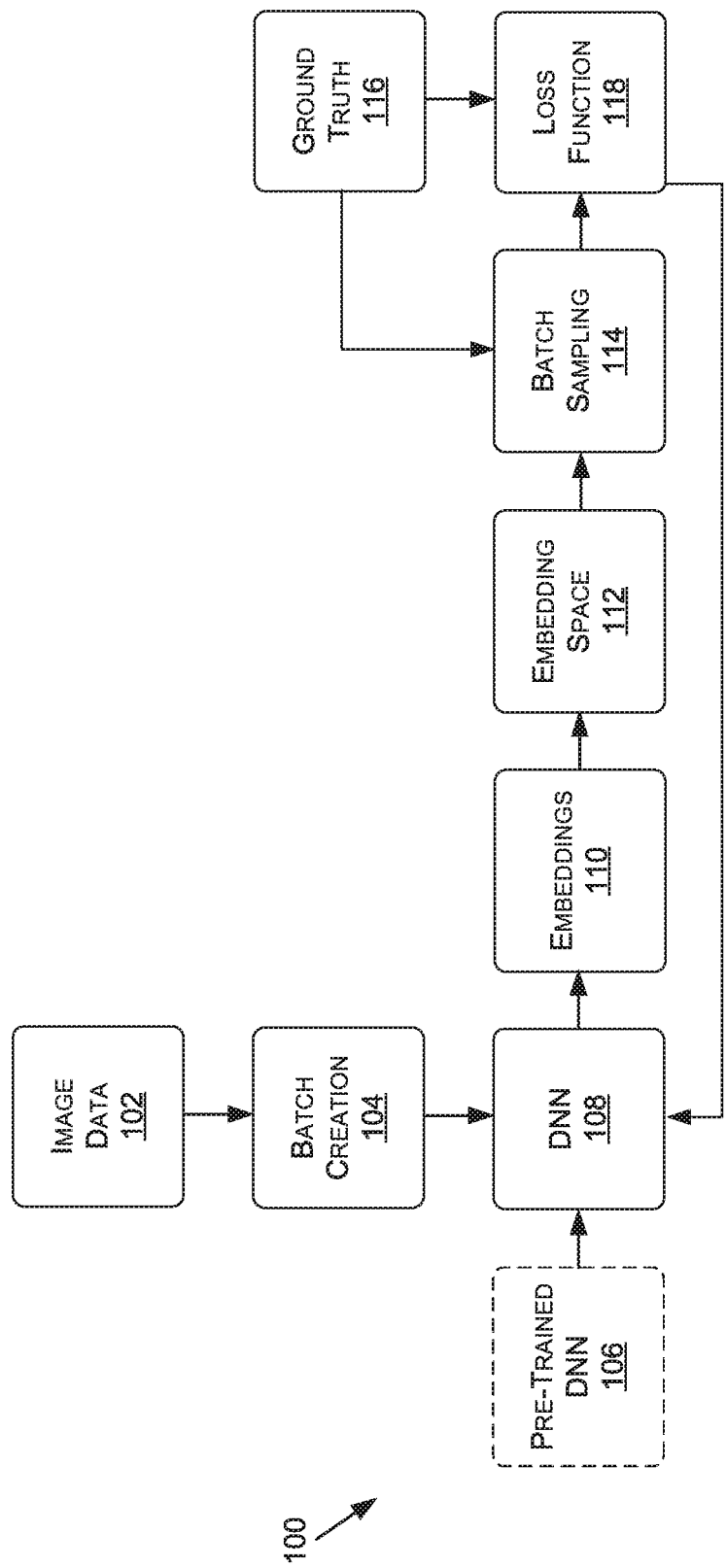
FIG. 1 is a data flow diagram for a process of training a deep neural network (DNN) to predict embeddings for object re-identification, in accordance with some embodiments of the present disclosure.

Systems and methods are disclosed related to training neural networks for vehicle re-identification. Although the present disclosure is described primarily with respect to vehicle re-identification, this is not intended to be limiting, and the systems and method described herein may be used for identification of other object types—such as persons, animals, drones, water vessels, aircraft, construction vehicles, military vehicles, etc.—without departing from the scope of the present disclosure.

Vehicle re-identification involves matching appearances of objects—and specifically vehicles—across different cameras and/or across multiple frames as captured by one or more cameras. This challenge is compounded in the vehicle re-identification use case for a variety of reasons, including: multiple views of a same vehicle are visually diverse and semantically correlated, meaning that the same identity must be deduced no matter the viewpoint that is given; precise vehicle re-identification requires extracting subtle physical cues—such as the presence of dust, written marks, or dents on the vehicle surface—to differentiate different vehicles of the same year, color, make, and/or model; and vehicle labels are less fine-grained than person, or face, identity labels given that there are a finite number of years, colors, makes, and models for vehicles in a given dataset (e.g., half or less than the diversity represented in person or face training data sets).

In order to match appearances of objects, an embedding (alternatively referred to as a feature vector or signature) for each object may be generated. A distance metric may then be used to determine the proximity of the embeddings to one another in an embedding space. The proximity of the embeddings in the embedding space may dictate the relationship—or match—between two or more of the objects. For example, the same object across multiple frames may have embeddings that are determined to be close to one another (e.g., within a threshold distance), while embeddings of different objects may be further apart (e.g., outside of a threshold distance).

As described herein, an effective embedding should be illumination-, scale-, and viewpoint-invariant such that a same object has similar embedding locations in the embedding space across frames even as the illumination, scale, viewpoint, and/or other differences in object appearance are depicted across multiple frames captured from any number of cameras. In order to train a deep neural network (DNN) to accurately and efficiently predict embeddings for objects, the DNN may be trained such that the embeddings are invariant to the various factors described herein. The embedding dimension of the embeddings may be a direct factor in the efficiency as well as the accuracy of the DNN as predicting the embedding space. For example, the larger the embedding dimension the more contextual information may be represented in each embedding, while decreasing the efficiency and increasing run-time of the system. As such, a goal of the system may be to determine a smallest possible embedding dimension that still allows for acceptable or optimal accuracy with respect to the embeddings predicted by the DNN in an embedding space. In a non-limiting example, as validated through testing (described herein), an embedding dimension of 128 units (or 256 units or less, in examples) may be used in some embodiments of the present disclosure while still yielding accurate results. For example, some conventional systems use embedding dimensions of 1024 units or 2048 units and produce less accurate results with longer run-times as compared to the system of the present disclosure. These conventional systems also require significantly greater computational resources during both inference and training because predicting, or being trained to predict, embeddings with a dimension of 1024 or more units is computationally more complex than 128 units (as a non-limiting example). By using a comparably smaller embedding dimension combined with efficient training parameters (e.g., triplet loss, batch sampling, etc.), as described herein, the smaller embedding dimension still yields accurate and usable results for predicting an embedding space by a DNN. In addition, computation costs and training time are reduced.

For example, the loss functions used during training may be selected such that the embeddings of the same object are closer in an embedding space than embeddings of different objects. In some examples, contrastive loss or triplet loss may be used for training a DNN to compute embeddings for objects. Contrastive loss uses, at each training instance, two instances of sensor data (e.g., images represented by image data)—each depicting a same object or different objects, where each instance is applied to an instantiation of the DNN. For example, a first image, $I_a$, may be an anchor image representing a first object, and a second image, $I_n$ or $I_p$, may be a negative image, $I_n$, representing a second object or a positive (p) image, $I_p$, representing the first object. As such, the DNN may output embeddings corresponding to the objects in each instance of the sensor data, and contrastive loss may be used to train the distance between the same objects across the two instances to be 0 (or another value within a threshold distance) and to train the distance between two different objects (e.g., the first object and the second object) across the two instances to be above a predefined threshold or margin, $\alpha$. In some examples, the margin, $\alpha$, for contrastive loss may be a hard margin of 1.0.

Triplet loss uses, at each training instance, three instances of sensor data (e.g., images represented by image data) each depicting a same object or different objects, where each instance is applied to an instantiation of the DNN. For example, a first image, $I_a$, may be an anchor image representing a first object, a second image, $I_n$, may be a negative image representing a second object, and a third image, $I_p$, may be a positive image also representing the first object. As such, the DNN may output embeddings corresponding to the first object in the anchor image, the first object in the positive image, and the second object in the negative image. A triplet loss function may then be used to train the DNN such that distances between the same objects is smaller than the distances between different objects. As such, each iteration of triplet loss factors in both a matching and a non-matching pair of objects, thereby leading to more accurate results than other loss functions with respect to learning an embedding space. In some examples, a margin, a, in triplet loss may be replaced by a SoftPlus function (e.g., $\ln(1+\exp(\bullet))$) which may avoid the need for tuning the margin, $\alpha$. In addition, in some embodiments when using triplet loss, no normalization layer for normalizing the embeddings may be used as using a normalized layer may collapse embeddings.

However, both contrastive loss and triplet loss, when applied to a dataset of N samples, have high computational complexity. For example, contrastive loss has a training complexity of $O(N^2)$ while triplet loss has a training complexity of $O(N^3)$. As such, contrastive loss and triplet loss may be computationally prohibitive for some datasets, and may be prohibitive for datasets of a large enough size to train a DNN to predict accurate embeddings in an embedding space. For example, computing loss over only trivial data points may impair convergence of the DNN. In the context of vehicles, it may be informative for a loss function to sample from different views of the vehicle (e.g., side, front, rear, top, etc.) for the same identity as represented in a robust dataset, than to consider samples of similar views repeatedly as represented in a minimal dataset.

To account for this computational complexity, sampling approaches may be employed to capture subsets of a robust dataset that are more difficult for the DNN to compute accurately (e.g., subsets of the dataset for which the DNN is less accurate at predicting embeddings). For example, some conventional approaches use hard data mining (or sampling) where, at each iteration, the DNN is applied on a validation set to mine hard data on which the DNN is performing poorly. Only the hard data that is mined is then used by an optimizer (e.g., a training component) to increase the ability of the DNN to learn effectively and converge more quickly to an acceptable or optimal accuracy. However, because hard data mining tends to capture primarily outliers in the data, and because the DNN is only presented with this hard data (e.g., the outliers), the ability of the DNN to discriminate outliers from normal data suffers.

As such, in order to account for (and not rely solely on) the outliers, semi-hard sampling may be used to mine moderate subsets of the data that are neither too hard (e.g., difficult for the DNN to perform accurately) nor too trivial for establishing meaningful gradients during training of the DNN. Some conventional approaches to semi-hard sampling use an offline method on a central processing unit (CPU) which impedes convergence by the DNN. As such, in some embodiments, samples of the dataset may be mined in a semi-hard fashion directly on a graphics processing unit (GPU). For example, batches may be generated from the dataset that include P identities from the dataset, X, and then randomly sampling K images for each identity, P. As a result, each batch may include PK images, in some non-limiting embodiments. In some examples, P may be equal to 18 and K may be equal to 4, such that each batch is 72 (PK) images. Samples may be selected such that the entire training dataset is iterated over during the course of a training epoch.

Once the batch is determined, a sampling method, such as batch hard (BH), batch all (BA), batch sample (BS), or batch weighting (BW), each of which is described in more detail herein, may be used to determine a subset of the samples from each batch that are to be used by an optimizer to increase the ability of the DNN to learn effectively and converge more quickly to an acceptable or optimal accuracy. During testing and validation, as described in more detail herein, BS and BW performed more effectively by producing more accurate results as computed using mean-average precision (mAP) and top-k accuracy. However, BS may perform with similar or better accuracy than BW on some datasets and according to some evaluation metrics, while requiring less samples to be used by the optimizer (e.g., a single sample from each batch may be used for BS while BW may use some or all of the samples with varying weights)

The datasets may also undergo augmentation (e.g., online augmentation) using one or more GPUs (e.g., NVIDIA's VOLTA GPU) as hardware and a machine learning platform (e.g., TENSORFLOW) for software. The data augmentation may include an image-flip operation in some embodiments. However, this is not intended to be limiting, and any other data augmentation operation may be performed in addition to or alternatively from image-flipping, such as rotating, scaling, color augmentation, zooming, cropping, etc.

In some embodiments, the DNN may be trained from scratch (e.g., end-to-end) or may be trained from a pre-existing, or pre-trained DNN. Depending on whether the training is done from scratch or fine-tuned using a pre-trained DNN, different learning rate schedules may be employed. For example, where trained from scratch, a first learning rate may be used that is greater than a second learning rate used when training from a pre-trained DNN. Once the DNN architecture is determined, which may be a convolutional neural network (CNN) in non-limiting embodiments, the DNN may be trained on batches—or subsets thereof determined using sampling or mining, as described herein—of one or more datasets using contrastive loss or triplet loss. An optimizer may be used, such as, without limitation, an Adam optimizer (e.g., with default parameters in non-limiting examples, $\varepsilon=10^{-3}$, $\beta_1=0.9$, $\beta_2=0.999$).

In addition, using the DNN architecture and training method described herein, spatio-temporal information—a staple of conventional systems—is not required to make accurate object re-identifications (and specifically, vehicle re-identifications) across frames. However, in some embodiments, spatio-temporal information may be leveraged to further improve accuracy, or for redundancy.

The DNN of the present disclosure, once trained according to the training processes described herein, may accurately and efficiently (e.g., in real-time or near real-time) compute embeddings for objects in an environment. The embeddings may then be compared with respect to an embedding space to determine objects that are the same or different, such that objects can be re-identified and/or tracked across frames captured from any number of cameras. For example, a camera network—such as in a city, parking garage, etc.—may be leveraged to track objects as they travel through the fields of view of the cameras. In this way, object movement and behavior may be tracked, and the information may be used for anomaly detection, pattern recognition, traffic monitoring, and/or the like.

Now referring to FIG. 1, FIG. 1 includes a data flow diagram for a process 100 of training a deep neural network (DNN) to predict embeddings for object re-identification, in accordance with some embodiments of the present disclosure. Image data 102 may be received and/or generated that is representative of images (e.g., still or video) captured by any number of cameras. For example, the image data 102 may be representative of images captured sequentially by a single camera, images captured at a same time by multiple cameras, or images captured over time by multiple cameras. The image data 102 used to train DNN 108 may include images of vehicles (or other object types), such as multiple images (e.g., of varying viewpoints, illumination levels, orientations, etc.) of multiple different vehicle types or identities. For example, there may be multiple images of a first car, multiple images of a second car, and so on, where each different image represents a different viewpoint, illumination level, occlusion level, orientation, and/or other capture parameter of the vehicle. The image data 102, in some non-limiting examples, may include images from pre-curated datasets—such as a VeRi dataset, a VehicleID dataset, or a PKU-VD dataset, described in more detail herein.

The images represented by the image data 102 may undergo batch creation 104 to generate batches of images. For example, in some non-limiting embodiments, batches may be generated that include P identities from the dataset, X, and K images may be randomly sampled for each identity, P. As a result, each batch may include P*K images, in some non-limiting embodiments. In some non-limiting examples, P may be equal to 18 and K may be equal to 4, such that each batch is 72 (PK) images. By using this number of images, diversity in batches may be effectively generated while still maintaining a relatively small batch size for training—thereby decreasing overall training time and reducing compute resources. Other examples may include using other batch sizes, such as where P is equal to 18 and K may be equal to 16, for a total batch size of 288 (PK) images. Such an example batch size may be used where a BW sampling variant is used, because more samples may be applied to the optimizer thereby benefiting from greater diversity in samples. These example batch sizes are provided as examples that resulted in accurate and efficient results during testing and validation. However, these example batch sizes are not intended to be limiting, and any batch size may be used without departing from the scope of the present disclosure. In non-limiting embodiments, samples may be selected such that the entire training dataset is iterated over during the course of a training epoch.

The batches of images (as represented by the image data 102) may be provided as input to a deep neural network (DNN) 108. In some examples, the DNN 108 may be pre-trained prior to being used as the DNN 108 for learning embeddings 110. For example, the pre-trained DNN 106 may be trained on another dataset(s) (e.g., on other image data) to predict embeddings. In some examples, the pre-trained DNN 106 may be trained to predict embeddings for re-identification tasks. In other examples, the pre-trained DNN 106 may be trained to predict embeddings for other tasks, and the training described with respect to the process 100 may be used to update the pre-trained DNN 106 to generate the DNN 108 for predicting the embeddings 110 for re-identification tasks, such as vehicle re-identification tasks. In embodiments where a pre-trained DNN is used, the learning rate may be different from the learning rate used when the DNN 108 is not trained from the pre-trained DNN 106. For example, where the DNN 108 is trained from the pre-trained DNN 106, a first learning rate may be used that is less than a second learning rate used when the DNN 108 is trained from scratch (e.g., end-to-end). As a non-limiting example, the first learning rate may preferably be between 0.0002 and 0.0004, more preferably between 0.00025 and 0.00035, and most preferably 0.0003. As another non-limiting example, the second learning rate may preferably be between 0.002 and 0.0005, more preferably between 0.0015 and 0.0008, and most preferably 0.001.

The pre-trained DNN 106 and/or the DNN 108 may include any type of machine learning model(s). For example, although examples are described herein with respect to using neural networks, and specifically convolutional neural networks (CNNs), this is not intended to be limiting. As such, and without limitation, the pre-trained DNN 106 and/or the DNN 108 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In embodiments where the pre-trained DNN 106 and/or the DNN 108 include a CNN, one or more of the layers of the CNN may include an input layer. The input layer may hold values associated with the image data 102. For example, when the image data 102 is an image(s), the input layer may hold values representative of the raw pixel values of the image(s) as a volume (e.g., a width, W, a height, H, and color channels, C (e.g., RGB), such as 32×32×3), and/or a batch size, B (e.g., after batch creation 104).

One or more layers may include convolutional layers. The convolutional layers may compute the output of neurons that are connected to local regions in an input layer (e.g., the input layer), each neuron computing a dot product between their weights and a small region they are connected to in the input volume. A result of a convolutional layer may be another volume, with one of the dimensions based on the number of filters applied (e.g., the width, the height, and the number of filters, such as 32×32×12, if 12 were the number of filters).

One or more of the layers may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers may include a pooling layer. The pooling layer may perform a down-sampling operation along the spatial dimensions (e.g., the height and the width), which may result in a smaller volume than the input of the pooling layer (e.g., 16×16×12 from the 32×32×12 input volume). In some examples, the pre-trained DNN 106 and/or the DNN 108 may not include any pooling layers. In such examples, strided convolution layers may be used in place of pooling layers. In some examples, the DNN may include alternating convolutional layers and pooling layers.

One or more of the layers may include a fully connected layer. Each neuron in the fully connected layer(s) may be connected to each of the neurons in the previous volume. In some examples, no fully connected layers may be used in an effort to increase processing times and reduce computing resource requirements. In such examples, where no fully connected layers are used, the pre-trained DNN 106 and/or the DNN 108 may be referred to as a fully convolutional network.

One or more of the layers may, in some examples, include deconvolutional layer(s). However, the use of the term deconvolutional may be misleading and is not intended to be limiting. For example, the deconvolutional layer(s) may alternatively be referred to as transposed convolutional layers or fractionally strided convolutional layers. The deconvolutional layer(s) may be used to perform up-sampling on the output of a prior layer. For example, the deconvolutional layer(s) may be used to up-sample to a spatial resolution that is equal to the spatial resolution of the input images (e.g., represented by the image data 102), or used to up-sample to the input spatial resolution of a next layer.

Although input layers, convolutional layers, pooling layers, ReLU layers, deconvolutional layers, and fully connected layers are discussed herein, this is not intended to be limiting. For example, additional or alternative layers may be used in such as normalization layers, SoftMax layers, SoftPlus layers, and/or other layer types. As described herein, in some embodiments, normalization layers for normalizing the embeddings 110 may not be used in an effort to reduce collapsing of the embeddings 110. For example, as illustrated in FIG. 4A and during testing, performance of the DNN 108 when using triplet loss without normalization was better than when normalization was used.

At least some of the layers of the CNN may include parameters (e.g., weights and/or biases), while others may not, such as the ReLU layers and pooling layers, for example. In some examples, the parameters may be learned by the pre-trained DNN 106 and/or the DNN 108 during training. Further, some of the layers may include additional hyper-parameters (e.g., learning rate, stride, epochs, kernel size, number of filters, type of pooling for pooling layers, etc.)—such as the convolutional layer(s), the deconvolutional layer(s), and the pooling layer(s)—while other layers may not, such as the ReLU layer(s). Various activation functions may be used, including but not limited to, ReLU, leaky ReLU, sigmoid, hyperbolic tangent (tanh), exponential linear unit (ELU), etc. The parameters, hyper-parameters, and/or activation functions are not to be limited and may differ depending on the embodiment.

The image data 102 within each batch may be applied to the DNN 108, and the DNN may compute or predict the embeddings 110. The embeddings may be representative of feature vectors having an embedding dimension, where the embeddings represent a location in an embedding space 112 corresponding to a particular object—e.g., a vehicle. The goal of training the DNN 108 may be to predict embeddings 110 for the same object as closer together while embeddings 110 for different objects are further apart. As such, where the embeddings 110 are closer together (e.g., within a threshold distance) within the embedding space 112, the determination may be that the two embeddings 110 belong to the same object. As such, where two or more embeddings 110 of the same object are close to one another, and the embeddings 110 are computed from two or more different images (e.g., from different cameras, viewpoints, perspectives, orientations, lighting levels, etc.), the same object may be re-identified in each of the images for performing one or more operations (e.g., tracking the object, detecting anomalies, etc.).

The DNN 108 may be trained to compute the embeddings 110 with an embedding dimension. For example, as described herein, the larger the embedding dimension the more context that may be present in the embeddings 110 to differentiate between same and different objects. However, larger embedding dimensions lead to longer training times for the DNN 108 and increases in compute resources during training and inference. For example, embedding dimensions over 256 units may limit the DNN 108 to non-real time deployments as the DNN 108 may not be able to compute the embeddings 110 for use in real-time or near real-time. As such, in some non-limiting embodiments, the embedding dimensions for the DNN 108 may preferably be equal to or less than 256 units, and more preferably may be 128 units. Testing and validation of the DNN 108, as indicated in FIGS. 4A-4D, has proven that the DNN 108 has acceptable accuracy even when 128 units is the embedding dimension. As such, because of the batch sampling variant (e.g., BS and/or BW) used, the use of triplet loss for training the DNN 108, and/or other training parameters described herein, the DNN 108 may be trained to compute the embeddings 110 with an embedding dimension of 128 units while producing accurate and efficient results enabling real-time deployment of the DNN 108 for re-identification tasks.

The embeddings 110 may be applied to an embedding space 112, where the embedding space 112 may be used to detect clusters, or groups, of the embeddings 110 that belong to a same object. The embedding space 112 may be the space in which the data is embedded after dimensionality reduction by the DNN 108. During inference, the locations of the embeddings 110 in the embedding space 112 may be used to re-identify objects and/or to determine two or more objects are not the same object. Similarly, during training, when two or more embeddings 110 are known to belong to a same object or differing objects (as represented in ground truth 116), the location of the embeddings 110 in the embedding space 112 may be used to determine the accuracy of the DNN 108, and to update the parameters of the DNN 108 using a loss function(s) 118 (e.g., a triplet loss function, in some examples). For example, where the predictions by the DNN 108 indicate that two embeddings 110 corresponding to a same object are far apart in the embedding space 112, this information may be used to update the DNN 108 such that the two embeddings 110 are predicted closer to one another. Similarly, where the predictions by the DNN 108 indicate two embeddings 110 corresponding to differing object are close together in the embedding space 112, this information may be used to update the DNN 108 such that the two embeddings 110 are predicted further apart from one another.

The embeddings 110 computed by the DNN 108 for a batch of the image data 102 may be sampled using a batch sampling variant during batch sampling 114. For example, triplet loss or contrastive loss may be computationally prohibitive for practical datasets, so batch sampling 114 may be used to narrow down the data points for computing losses (e.g., to identify embeddings 110 that are more useful for training the DNN 108). This may be valuable as computing loss over trivial or inaccurate data points (e.g., outliers, anomalies, etc.) may impair convergence of the DNN 108. In the context of vehicle re-identification, it may be more informative to sample from different views (e.g., a side view and a front view) for the same identity than to consider samples from the same views repeatedly.

Figure 2A:
FIG. 2A is a table including equations for calculating weights for various sampling variants, in accordance with some embodiments of the present disclosure.
Figure 2B:
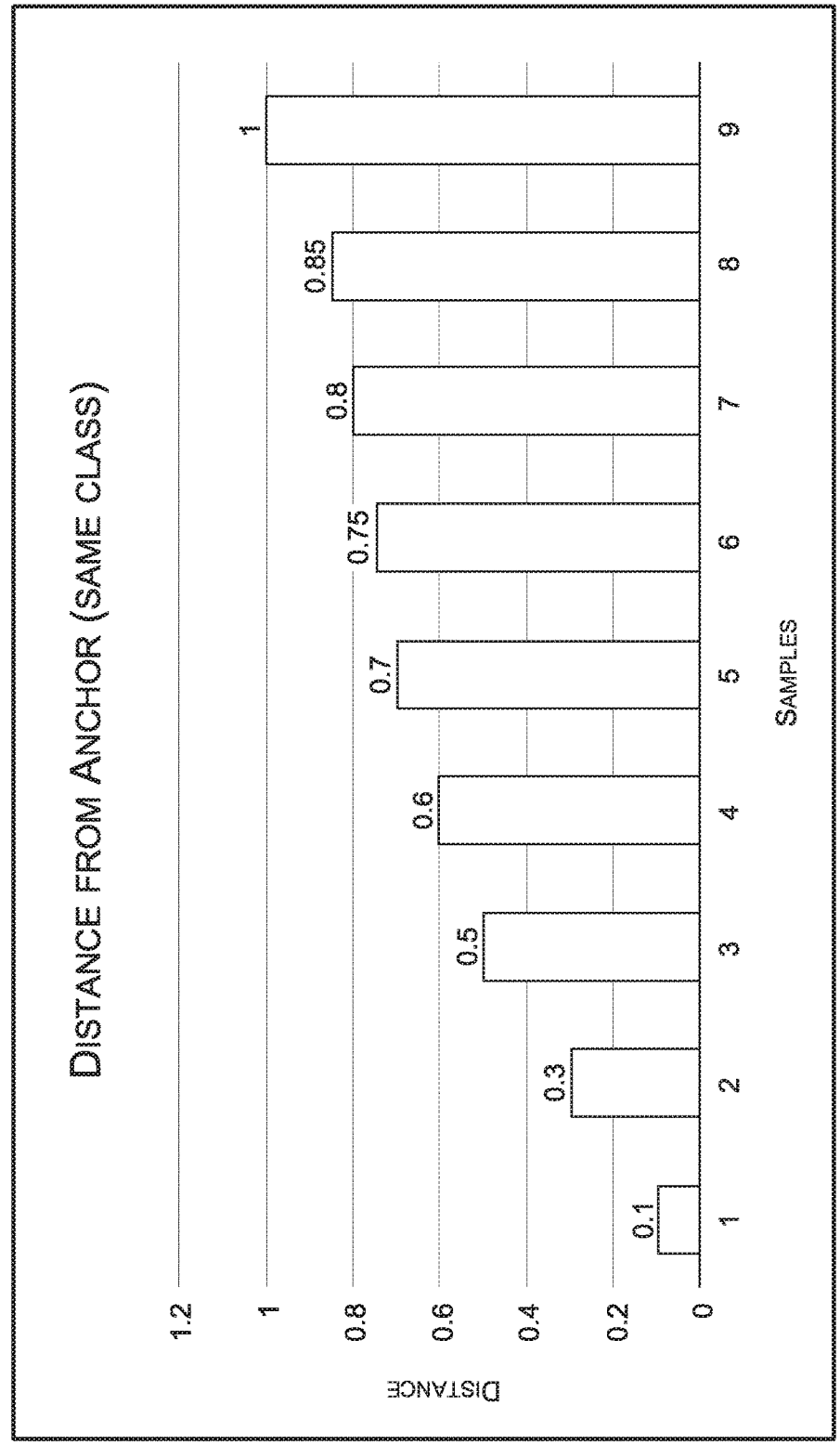
FIG. 2B is a chart including distances for embeddings from an anchor embedding, in accordance with some embodiments of the present disclosure.
Figure 2C:
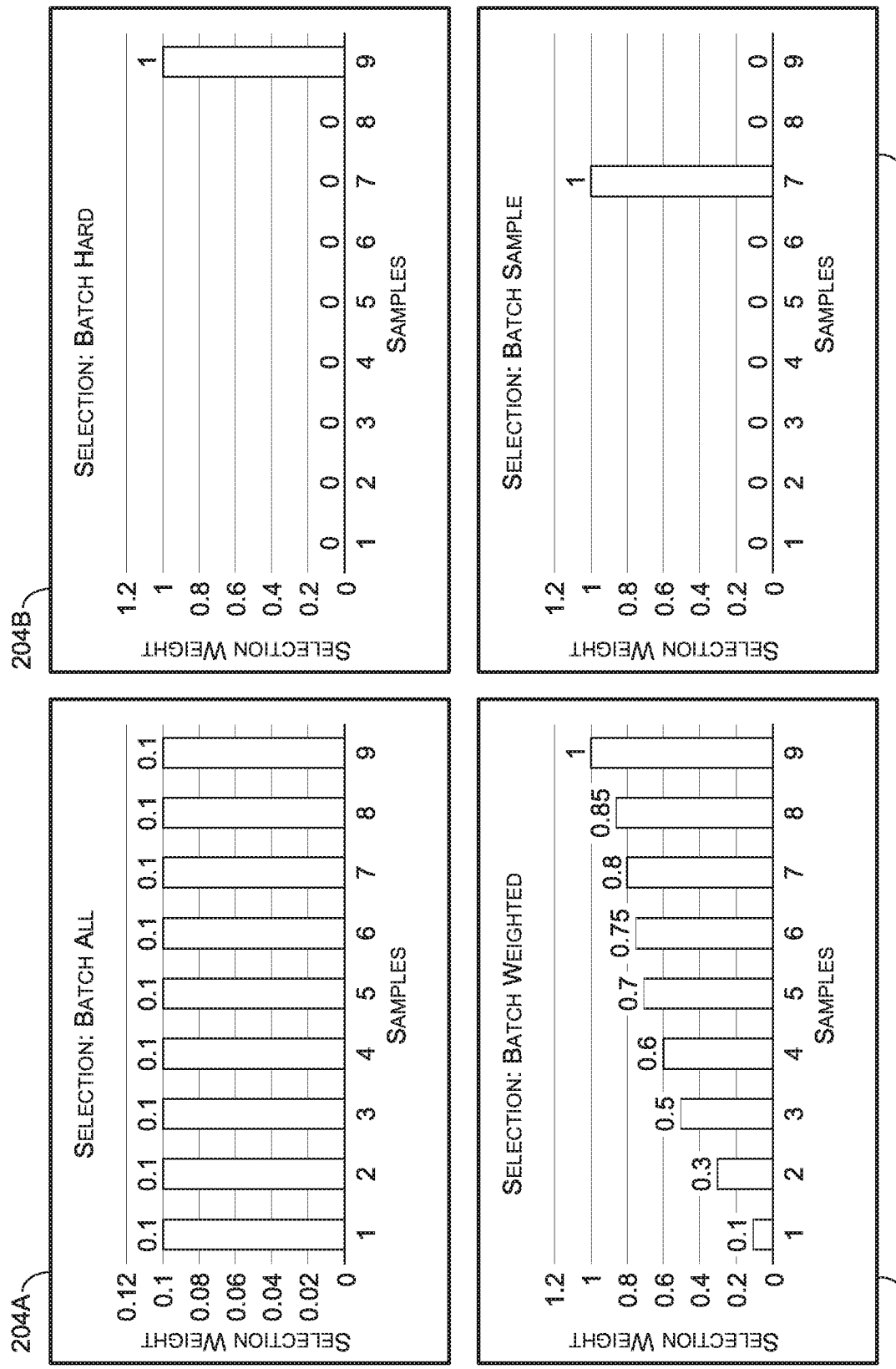
FIG. 2C includes charts illustrating weights for various sampling variants, in accordance with some embodiments of the present disclosure.

For non-limiting examples, as described herein at least with respect to FIGS. 2A-2C, various batch sampling variants may be used. For example, batch all (BA), batch hard (BH), batch weighting (BW), batch sample (BS), or another sampling variant may be used. In one or more non-limiting examples, as indicated in FIGS. 4A-4D, BW and BS may provide the most accurate results with respect to predictions by the DNN 108 after training.

BA is a uniform sampling technique that gives uniform weights to all samples in the batch. For example, and with reference to FIG. 2A, each of the samples may be used (e.g., by the optimizer, using the loss function 118), and each sample may be given a uniform weight (e.g., 1). However, uniform weight distribution may ignore the contribution of important tough (or hard) samples as these tough samples are generally outweighed by the trivial (or easy) samples. BH is characterized by hard data mining for each batch, where only the hardest positive and negative samples (e.g., most difficult for the DNN 108 to compute accurately) are used for each anchor sample. However, the most difficult samples are often outliers, and outliers may lead to inaccuracies. For example, mislabeled data (e.g., improper ground truth 116) may lead to samples being diagnosed as hard, when in fact the computation is accurate and the label is incorrect, thereby leading to inaccurate data being used for training.

To compensate for the drawbacks of BA and BH, BW and/or BS may be used. BW employs a weighting scheme where a sample is weighted based on its distance from the corresponding anchor, thereby giving more importance to the informative, harder samples than trivial samples. BS uses a distribution of anchor to sample distances to mine positive and negative data for an anchor. For example, BS treats all distances as probabilities, and these probabilities are given to a multinomial distribution generator (or categorical distribution generator). The output of the generator then indicates a negative sample and/or a positive sample of the samples that should be used for training. The sample may be a single sample for each of positive and negative. As such, similar to BH, the single sample may be given the full weight, or a weight of 1. In some examples, the values of the distances may not sum to 1 (as is generally assumed for a distribution), but this does not present an issue as the underlying implementation intrinsically addresses this issue. Using BS further avoids deterministic sampling by using a probabilistic sampling approach, thereby providing outlier protection for mislabeled data, or for other outliers or anomalies in the data.

With reference to FIG. 2A, FIG. 2A is a table including example equations for calculating weights for various sampling variants, in accordance with some embodiments of the present disclosure. The table 100 summarized different ways of sampling positives, p, and negative, n, using different batch sampling variants. In the table 100, a is an anchor sample, N(a) is a subset of negative samples for the corresponding anchor, a, P(a) is a subset of the positive samples for the corresponding anchor, a, $w_n$ represents the weight (importance) of a negative sample, n, and $w_p$ represents the weight (importance) of a positive sample, p.

FIG. 2B is a chart 202 including example distances for embeddings from an anchor embedding, in accordance with some embodiments of the present disclosure. For example, the chart 202 includes distances from an anchor (in the embedding space 112) for nine different samples. The chart 202 may represent distances for positive samples, and a similar chart may be used for negative samples (except shorter distances would be penalized more for negative samples). In some examples, the distances may be normalized (as in the chart 202), while in others the distances may not be normalized.

FIG. 2C includes charts 204A-204D illustrating weights for various sampling variants, in accordance with some embodiments of the present disclosure. For example, chart 204A includes an illustration of using BA on the distances from the chart 202. In such an example, each of the samples would be given an identical weight (e.g., 0.1 in this non-limiting example). Chart 204B includes an illustration of using BH, where the hardest sample (e.g., the positive sample predicted to be the furthest from the anchor, even though they are of the same object) is given the full weight (e.g., 1.0 in this non-limiting example). Chart 204C includes an illustration of using BW, where the samples are each weighted based on their distance from the anchor such that further distances for positive samples are weighted more heavily than closer distances. This weighting would be reversed for negative samples, where closer samples would be more heavily weighted than negative samples. Chart 204D includes an illustration of using BS, where each of the distances are converted to a probability, and a multinomial distribution generator generates an output indicating that sample 7 is the most effective sample to use for training. This may be because there is a higher probability for the distance of 0.8 corresponding to sample 7, thereby weeding out the potential outlier of sample 9 that was captured using BH. As such, the most relevant sample may be captured using the BS sampling variant due to the probabilistic nature of the sampling technique.

Again with reference to FIG. 1, once the positive and/or negative samples have been mined using batch sampling 114, the mined samples may then be used by an optimizer using the loss function 118 to train the DNN 108. As such, because the samples being used for training have been mined (e.g., using BW and/or BS in preferred embodiments), compute resources are reduced as compared to conventional systems because the training set is fine-tuned and thus leads to faster convergence. In addition, the DNN 108 may be more accurate after training due to the outliers being pruned from the training set and the more informative data points being used (or more heavily weighted, with respect to BW) in place of more trivial data points.

The loss function 118 may include a contrastive loss function or a triplet loss function, in some embodiments. However, as described herein, triplet loss has been shown to be an effective loss function for training the DNN 108 (as indicated at least in FIG. 4A). This accuracy of the DNN 108 using triplet loss may be a result of the additional context provided by using both a positive and a negative sample in the same term. Triplet loss forces the data points from the same class to be closer to each other than a data point from any other class. A triplet loss function may be represented, in non-limiting examples, by equation (1), below:

$$l_{triplet}(a,p,n)=[D_{ap}-D_{an}+\alpha]_+ \qquad (1)$$

Another representation of triplet loss includes equation (2), below:

$$l_{triplet}(a)=[\alpha+\Sigma_{p\in P(a)}w_p D_{ap}-\Sigma_{n\in N(a)}w_n D_{an}]_+ \qquad (2)$$

As such, the total loss in a training epoch may be obtained according to equation (3), below:

$$\mathcal{L}_{(\theta;\chi)}=\Sigma_{all\ batches}\Sigma_{a\in B}l_{triplet}(a) \qquad (3)$$

In some embodiments, the margin, $\alpha$, in the triplet loss function may be replaced by a SoftPlus function, $\ln(1+\exp(\bullet))$, to avoid the need of tuning the margin.

With reference to FIG. 3, FIG. 3 is an illustration of using triplet loss for training a DNN to predict embeddings, in accordance with some embodiments of the present disclosure. For example, first image data representative of an anchor image 202A may be applied to an instantiation of the DNN 108A to generate the embedding 110A, second image data representative of positive image 202B may be applied to an instantiation of the DNN 108B to generate the embedding 110B, and third image data representative of negative image 202C may be applied to an instantiation of the DNN 108C to generate the embedding 110C. The ground truth 116 may indicate that the positive image 202B includes a same vehicle as the anchor image 202A and that the negative image 202C includes a different vehicle than the anchor image 202A. As such, the embeddings 110A, 110B, and 110C may be applied to a triplet loss function 204, as part of an optimizer or training machine for the DNN 108, to update parameters (e.g., weights and biases) of the DNN 108. For example, where the vehicle in the positive image 202B is far from the vehicle of the anchor image 202A in the embedding space 112, the triplet loss function 204 may be used to update the DNN 108 to predict the embedding 110B to be closer to the embedding 110A in subsequent iterations. Similarly, where the vehicle in the negative image 202C is close to the vehicle of the anchor image 202A in the embedding space 112, the triplet loss function 204 may be used to update the DNN 108 to predict the embedding 110C as further away from the embedding 110A in subsequent iterations. In some examples, as described herein, the positive image 202B and the negative image 202C may be selected and/or weighted using a batch sampling variant, such as BS or BW.

To test and validate the various combinations of training, batch sampling variants, hyper-parameters, and DNN architectures, various evaluation metrics were used. For example, mean-average-precision (mAP) and top-k accuracy were used for evaluating and comparing various approaches. For example, in a re-identification evaluation setup, there may be a query set and a gallery set. For each vehicle in a query set, the aim or goal may be to retrieve a similar identity from the gallery set. As such, AP(q) for a query image, q, may be defined according to equation (4), below:

$$AP(q) = \frac{\sum_k P(k) \times \delta_k}{N_{gt}(q)} \quad (4)$$

where k is the rank, P(k) is the precision at rank, k, $N_{gt}(q)$ is the total number of true retrievals for q, $\delta_k$ is 1 when the matching of query image, q, to a gallery image is correct at rank<=k. mAP is then computed as an average over all query images according to equation (5), below:

$$mAP = \frac{\sum_q AP(q)}{Q} \quad (5)$$

where Q is the total number of query images.

Now referring to FIG. 4A, FIG. 4A is a table 400 including testing results on a dataset using contrastive loss or triplet loss and normalization or no normalization layers, in accordance with some embodiments of the present disclosure. For example, the table 400 includes example results of the VeRi dataset which includes 1,678 query images and 11,579 images in the gallery set. For each query image, the gallery set contains images of same query-identity but taken from different cameras—a key evaluation criteria as the same vehicles captured by different cameras include visually dissimilar samples. The table 400 includes results on the VeRi dataset using triplet loss and contrastive loss, as well as using normalization layers for the embeddings and not using normalization layers for the embeddings. As illustrated, a combination of BS, triplet loss, and no normalization layer produces the most accurate results with respect to mAP, top-1, and top-5, while BA, triplet loss, and no normalization produces the most accurate results with respect to top-2 (although BS is only slightly less effective).

Now referring to FIG. 4B, FIG. 4B is a table 402 including testing results on a dataset using various sampling variants, in accordance with some embodiments of the present disclosure. For example, table 402 includes results with the PKU-VD training set which includes two sub-datasets VD1 and VD2. Both of these training sets include about 400,000 training images, and the test set of each sub-dataset is split into three reference sets: small (VD1: 106,887 images; VD2: 105,550 images), medium (VD1: 604,432 images; VD2: 457,910 images), and large (VD1: 1,097,649 images; VD2: 807,260 images). Because of the size of the PKU-VD dataset, the DNN 108 may be trained from scratch. In addition, due to the number of intra-class samples, the batch size for triplet loss may be increased in some embodiments. The table 402 illustrates the mAP for various batch sampling variants on both sub-datasets of the PKU-VD datasets. As indicated, for VD1, BW outperforms other sampling variants for the small training set, and BH outperforms the others on the medium and large datasets for VD1. However, with respect to VD2, BW outperforms each other sampling variant for each of small, medium, and large datasets. In addition, each of the sampling variants outperform BA for all datasets.

Now referring to FIGS. 4C and 4D, FIGS. 4C and 4D are tables 404 and 406, respectively, including testing results on a dataset using various sampling variants, in accordance with some embodiments of the present disclosure. For example, tables 404 and 406 include results with the VehicleID training set which includes front and rear views of vehicles. Small (800 identities), medium (1600 identities), large (2400 identities) and x-large (13164 identities) are included in the VehicleID training set. For each reference set, an exemplar or anchor for each identity is randomly chosen, and a gallery set is constructed. This process is repeated ten times to obtain averaged evaluation metrics. The results in tables 404 and 406 include results on a DNN using no normalization layer for embedding. Table 404 uses a batch size of 18×16 (PK) and table 406 uses a batch size of 18×4 (PK). As indicated by tables 404 and 406, BS and BW outperform other sampling variants.

Figure 5:
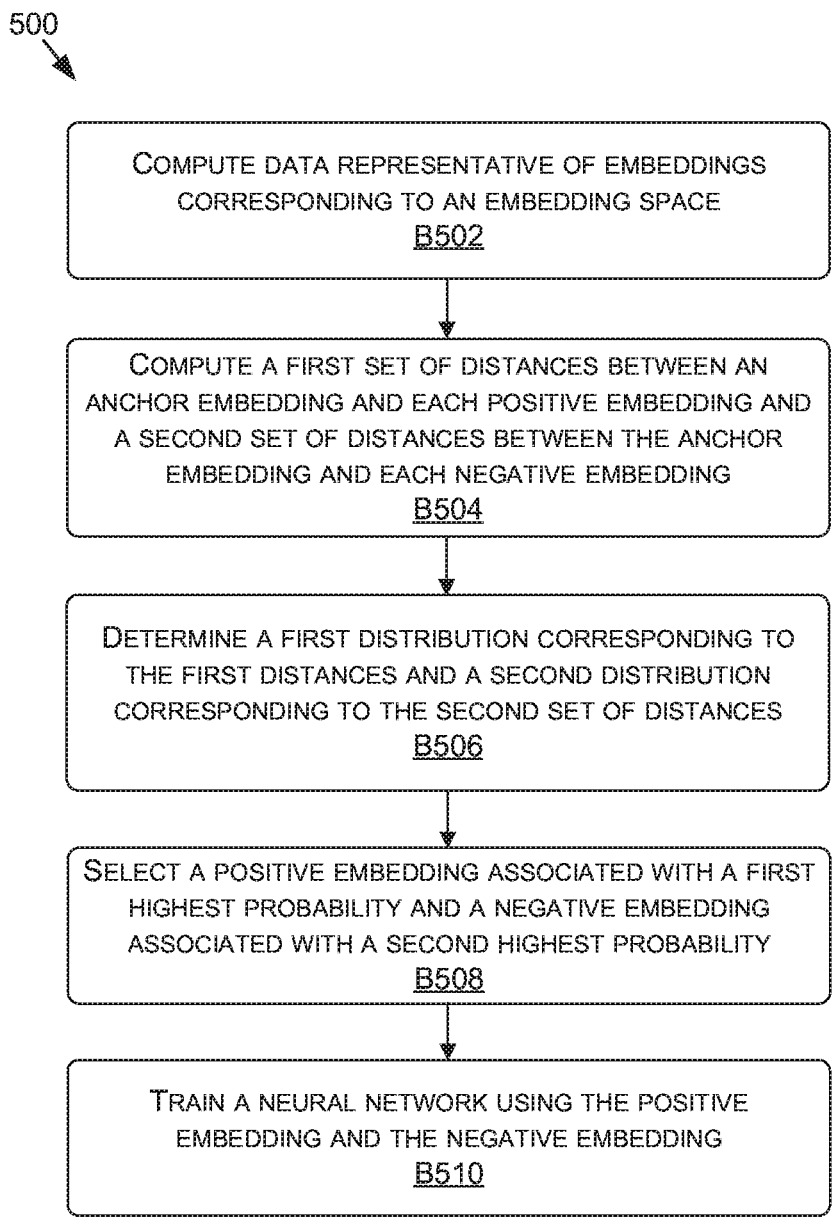
FIG. 5 is a flow diagram showing a method for training a deep neural network for predicting embeddings for object re-identification, in accordance with some embodiments of the present disclosure.

Now referring to FIG. 5, each block of method 500, described herein, comprises a computing process that may be performed using any combination of hardware, firmware, and/or software. For instance, various functions may be carried out by a processor executing instructions stored in memory. The method 500 may also be embodied as computer-usable instructions stored on computer storage media. The method 500 may be provided by a standalone application, a service or hosted service (standalone or in combination with another hosted service), or a plug-in to another product, to name a few. In addition, method 500 is described, by way of example, with respect to the process 100 of FIG. 1. However, this method may additionally or alternatively be executed by any system, or any combination of systems, including, but not limited to, those described herein.

FIG. 5 is a flow diagram showing a method 500 for training a deep neural network for predicting embeddings for object re-identification, in accordance with some embodiments of the present disclosure. The method 500, at block B502, includes computing data representative of embeddings corresponding to an embedding space. For example, the DNN 108 may compute the embeddings 110 corresponding to the embedding space 112.

The method 500, at block B504, includes computing a first set of distances between an anchor embedding and each positive embedding and second set of distances between an anchor embedding and each negative embedding. For example, where triplet loss is used, the first distances in the embedding space 112 may be determined for each positive embedding and an anchor embedding and the second distances in the embedding space 112 may be determined for each negative embedding and the anchor embedding.

The method 500, at block B506, includes determining a first distribution corresponding to the first distances and a second distribution corresponding to the second distances. In one or more embodiments, one or both of these distributions may be multinomial distributions, categorical distributions, or both. For example, BS may be used to calculate a first multinomial distribution for the positive samples and a second multinomial distribution for the negative samples.

The method 500, at block B508, includes selecting a positive embedding associated with a first highest probability and a negative embedding associated with a second highest probability. For example, the positive embedding with the highest probability from the plurality of positive embeddings from the batch may be selected and the negative embedding with the highest probability from the plurality of negative embeddings from the batch may be selected.

The method 500, at block B510, includes training a neural network using the positive embedding and the negative embedding. For example, the positive embedding and the negative embedding may be applied to an optimizer or training machine to update the parameters of the DNN 108.

Figure 6:
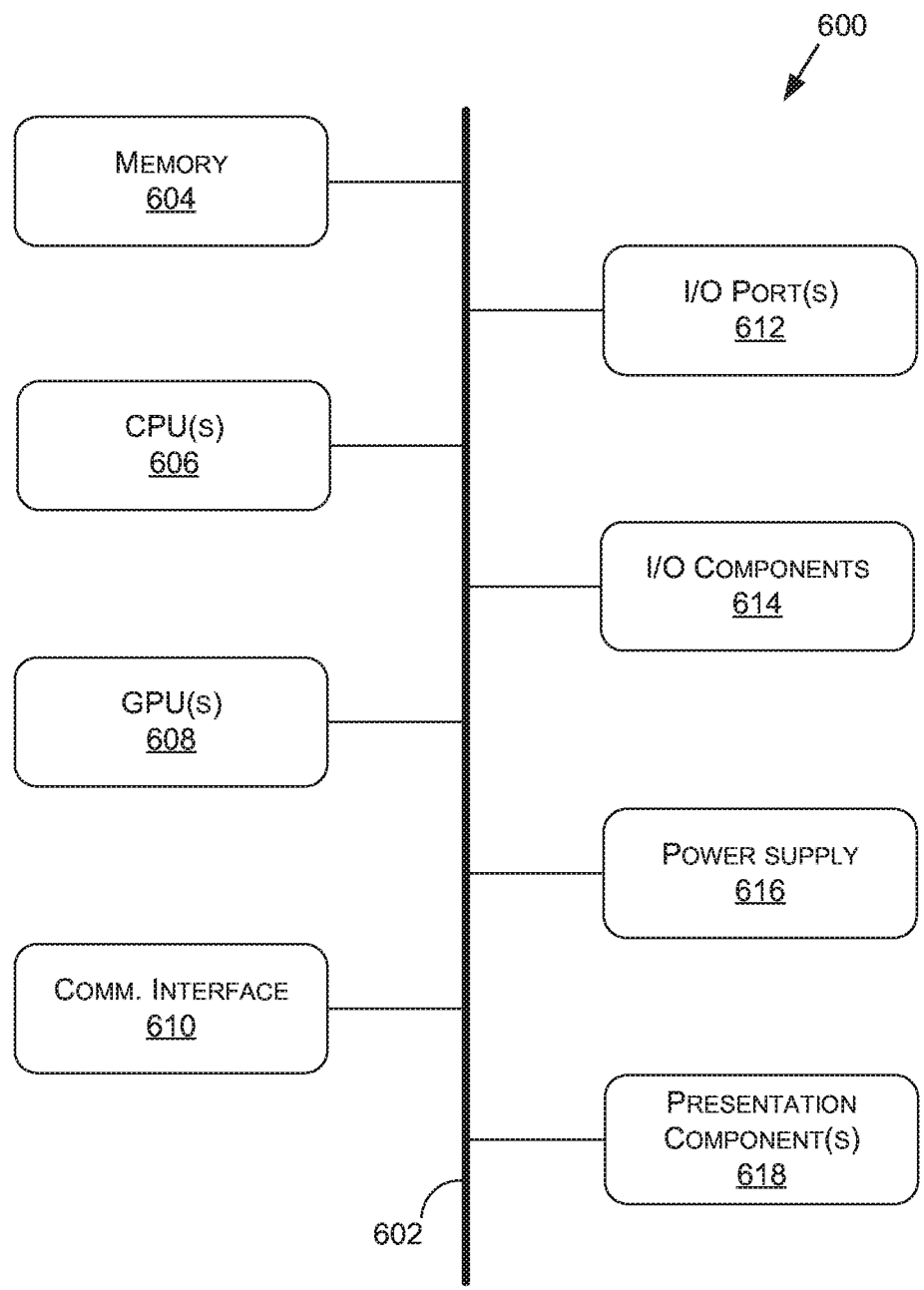
FIG. 6 is a block diagram of an example computing device suitable for use in implementing some embodiments of the present disclosure.

FIG. 6 is a block diagram of an example computing device 600 suitable for use in implementing some embodiments of the present disclosure. Computing device 600 may include a bus 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, and one or more presentation components 618 (e.g., display(s)).

Although the various blocks of FIG. 6 are shown as connected via the bus 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "handheld device," "game console," "electronic control unit (ECU)," "virtual reality system," "vehicle computer," and/or other device or system types, as all are contemplated within the scope of the computing device of FIG. 6.

The bus 602 may represent one or more busses, such as an address bus, a data bus, a control bus, or a combination thereof. The bus 602 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 606 may be configured to execute the computer-readable instructions to control one or more components of the computing device 600 to perform one or more of the methods and/or processes described herein. The CPU(s) 606 may be used to perform one or more of the functions described herein at least with respect to the process 100. For example, the CPU(s) 606 may be used during training and/or inference with respect to the DNN 108 to compute embeddings, perform batch sampling, and/or the like. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an ARM processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

The GPU(s) 608 may be used by the computing device 600 to render graphics (e.g., 3D graphics) and/or perform processing (e.g., parallel processing, general purpose processing as a general purpose GPU (GPGPU), etc.). The GPU(s) 608 may be used to perform one or more of the functions described herein at least with respect to the process 100. For example, the GPU(s) 608 may be used during training and/or inference with respect to the DNN 108 to compute embeddings, perform batch sampling, and/or the like. The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data. The display memory may be included as part of the memory 604. The GPU(s) 708 may include two or more GPUs operating in parallel (e.g., via a link). When combined together, each GPU 608 may generate pixel data for different portions of an output image or for different output images (e.g., a first GPU for a first image and a second GPU for a second image). Each GPU may include its own memory, or may share memory with other GPUs.

In examples where the computing device 600 does not include the GPU(s) 608, the CPU(s) 606 may be used to render graphics and/or perform other tasks within the process 100.

The communication interface 610 may include one or more receivers, transmitters, and/or transceivers that enable the computing device 700 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, etc.), and output the data (e.g., as an image, video, sound, etc.).

The disclosure may be described in the general context of computer code or machine-usable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including handheld devices, consumer electronics, general-purpose computers, vehicle computers, cloud-based computers, client/server architectures, distributed computer architectures, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   computing, using one or more instances of a neural network, data representative of embeddings corresponding to an embedding space, the embeddings including an anchor embedding corresponding to an anchor image and depicting a first vehicle, a plurality of positive embeddings corresponding to images depicting the first vehicle, and a plurality of negative embeddings corresponding to images depicting a second object from the first vehicle;
   computing, based at least in part on the data, a first set of distances between the anchor embedding and positive embeddings of the plurality of positive embeddings and a second set of distances between the anchor embedding and negative embeddings of the plurality of negative embeddings;
   determining a first distribution corresponding to the first set of distances and a second distribution corresponding to the second set of distances;
   selecting a positive embedding associated with a highest probability from the plurality of positive embeddings from the first distribution and a negative embedding with a highest probability from the plurality of negative embeddings associated from the second distribution; and
   training the neural network using the positive embedding and the negative embedding.

2. The method of claim 1, wherein the training the neural network is at a first learning rate when the neural network is trained from a pre-trained model, and the training the neural network is at a second learning rate greater than the first learning rate when the neural network is trained end-to-end.

3. The method of claim 2, wherein the first learning rate is between 0.0002 and 0.0004, and the second learning rate is between 0.0009 and 0.002.

4. The method of claim 1, wherein the embeddings include an embedding dimension of equal to or less than 128 units.

5. The method of claim 1, wherein the training the neural network includes using at least one of a contrastive loss function or a triplet loss function.

6. The method of claim 5, wherein the triplet loss function includes a SoftPlus function.

7. The method of claim 5, wherein the neural network does not include a normalization layer for computing the data.

8. The method of claim 1, wherein the training the neural network includes generating batches of images including a plurality of vehicle types and a plurality of samples of the vehicle types.

9. The method of claim 1, wherein the training the neural network uses one or more graphics processing units (GPUs).

10. The method of claim 1, further comprising deploying the neural network after training to identify vehicles across a plurality of images captured by one or more cameras.

11. The method of claim 1, wherein the positive embeddings other than the positive embedding and the negative embeddings other than the negative embedding are disregarded during the training of the neural network.

12. The method of claim 1, wherein at least one of the first distribution or the second distribution comprises at least one of a multinomial distribution or a categorical distribution.

13. A method comprising:
  computing, using a plurality of instances of a neural network, data representative of embeddings corresponding to an embedding space, the embeddings including a first embedding corresponding to an anchor image depicting a vehicle and a plurality of second embeddings corresponding to images depicting the vehicle;
  determining, based at least in part on the data, a distribution corresponding to distances between the first embedding and one or more second embeddings of the plurality of second embeddings;
  based at least in part on the distribution, selecting a second embedding from the plurality of second embeddings associated with a highest probability from the distribution; and
  training the neural network using the second embedding.

14. The method of claim 13, wherein the distribution is at least one of a multinomial distribution or a categorical distribution.

15. The method of claim 13, wherein training the neural network further includes using at least one of a contrastive loss function or a triplet loss function.

16. The method of claim 15, wherein, when the triplet loss function is used, the embeddings further include a plurality of third embeddings corresponding to other images depicting another object other than the vehicle, and the method further comprises:
  determining another distribution corresponding to distances between the first embedding and one or more third embeddings of the plurality of third embeddings; and
  based at least in part on the other distribution, selecting a third embedding from the plurality of third embeddings associated with another highest probability from the other distribution,
  wherein the training the neural network is further based at least in part on the third embedding.

17. The method of claim 15, wherein the triplet loss function includes a SoftPlus function.

18. A system comprising:
  one or more cameras to generate data representative of an environment;
  one or more processing units including processing circuitry to:
    compute, using a neural network, data representative of embeddings corresponding to an embedding space, the embeddings including a first embedding corresponding to an anchor image depicting a vehicle and a plurality of second embeddings corresponding to images depicting the vehicle; and
    train the neural network based at least in part on a second embedding selected from a distribution corresponding to distances between the first embedding and one or more second embeddings of the plurality of second embeddings and based at least in part on probabilities associated with the distribution.

19. The system of claim 18, wherein the distribution is at least one of a multinomial distribution or a categorical distribution.

20. The system of claim 18, wherein the neural network is further trained using a probabilistic sampling approach.

21. The system of claim 18, wherein the one or more processing units further including processing circuitry to deploy the neural network to identify vehicles based at least in part on a plurality of images captured by the one or more cameras.

* * * * *